Sept. 25, 1928.

A. E. LEE

BRAKE

Filed Oct. 30, 1926

1,685,709

INVENTOR
A. E. Lee,
BY
ATTORNEYS

Patented Sept. 25, 1928.

1,685,709

UNITED STATES PATENT OFFICE.

ADELBERT E. LEE, OF AKRON, OHIO.

BRAKE.

Application filed October 30, 1926. Serial No. 145,281.

My invention relates generally to improvements in brakes for motor vehicles, more particularly to an improved brake operating mechanism, and it consists in the combinations, constructions and arrangements herein described and claimed.

An object of the invention is the provision of a brake operating mechanism which affords facilities for making use of fluids, such as a suitable liquid or air, to expand an expansible and contractile member when desired and thereby to cause a braking member to frictionally contact with an associated brake drum.

A further object is the provision in a brake operating mechanism of the character described of a longitudinally expansible and contractile member which will be well braced and strengthened against lateral radial distortion or expansion and at the same time will be readily longitudinally expansible and contractile.

Figure 1:
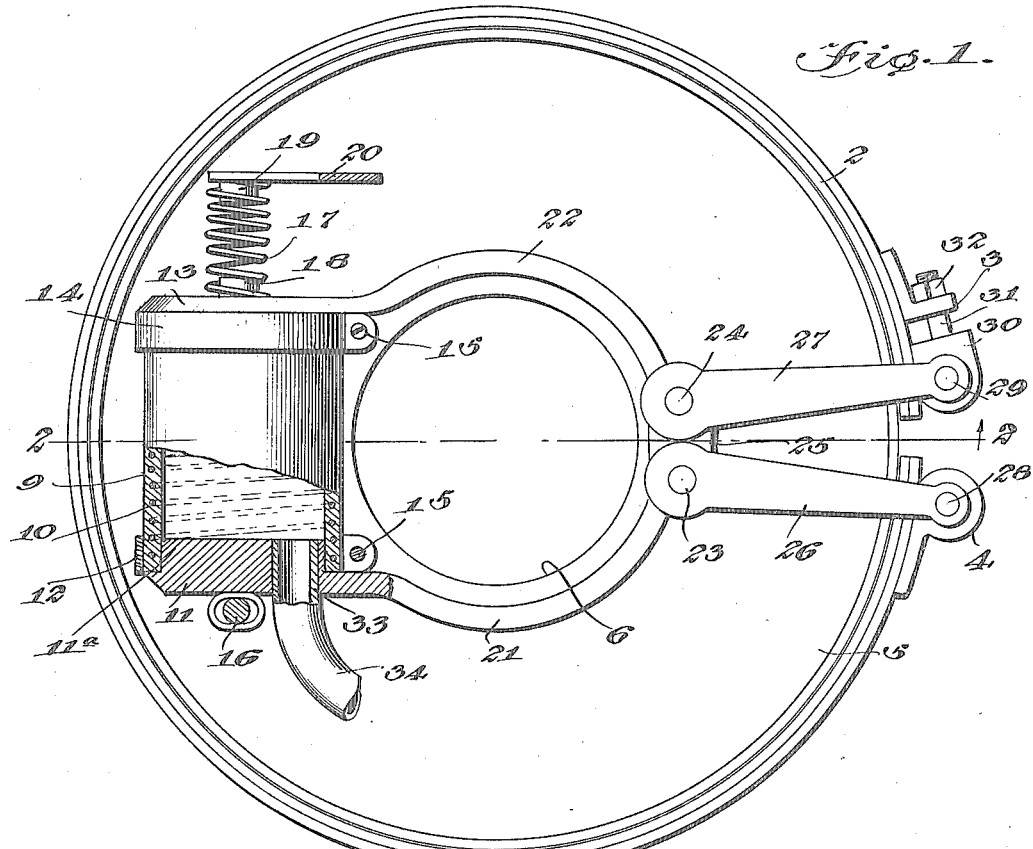
Figure 2:
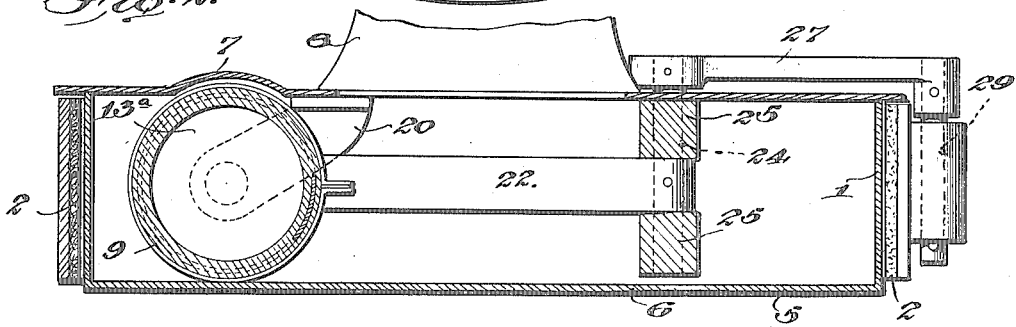
Figure 3:
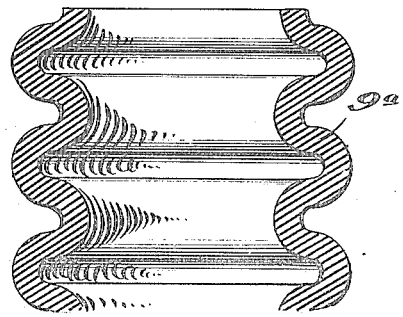

Other objects and advantages of the invention will be apparent from the following description, considered in conjunction with the accompanying drawings, in which Figure 1 is an end view of a brake drum equipped with the brake operating mechanism embodying the invention with the cover of the brake drum omitted and with portions of the brake operating mechanism broken away and other portions shown in section, Figure 2 is a section taken substantially along the line 2—2 of Figure 1, looking in the direction of the arrows, and Figure 3 is a longitudinal section through a modified form of a longitudinally expansible and contractile member which can be used in the brake operating mechanism embodying the invention.

In Figures 1 and 2, the numeral 1 designates a brake drum of any suitable type that is adapted to be associated with an automobile wheel (not shown), in the usual manner. The brake drum 1 is adapted to have a brake band 2 of conventional construction mounted thereon, and the ends of the brake band 2 are provided adjacent to their extremities with out turned fixed lugs or bracket arms 3 and 4, respectively. It will be understood that a braking action will be obtained when the ends of the brake band are forced toward each other and the brake band thus tightened on the brake drum. The brake drum may be closed at one end by an integral end member 5 which, in actual practice, will be secured to an associated wheel (not shown) and will be provided with a central opening 6 for the reception of portions of the hub of the wheel and the axle on which the wheel is mounted. The brake drum is covered at its opposite end by a brake drum cover 7 which may be integral with the housing 8 for the aforesaid axle. The brake operating mechanism includes a longitudinally expansible or extensible and contractile tubular member 9 which preferably is formed of rubber and may have any desirable configuration in cross section The tubular member 9 is reinforced against lateral or radial expansion or distortion by suitable reinforcing means which may comprise wires embedded in the material of the member 9 as indicated at 10 in Figure 1. The reinforcing wires 10 may be the convolutions of a coil spring which will permit longitudinal expansion and contraction of the member 9 and will prevent lateral expansion and distortion. The longitudinally expansible and contractile member may be of substantially uniform diameter or cross sectional area throughout its length as shown in Figure 1 or may be a circumferentially corrugated member as shown at 9ª in Figure 3.

The tubular member 9 may be disposed in vertical position within the brake drum as shown in Figure 1 and is closed at its lower end by a lower head 11 which preferably has a reduced upper portion 11ª which fits tightly in the lower end portion of the member 9 and to which the lower end portion of the member 9 is firmly secured by a suitable clamp 12. A similar upper head 13 has a reduced lower portion 13ª fitting in the upper end portion of the member 9 and to which the upper end portion of the member 9 is firmly secured by the clamp 14. The clamps 12 and 14 may be of the usual split ring type with out turned apertured ears connected by fastening devices 15 so that the clamps can be secured tightly in place or loosened when desired, for any purpose.

The lower head 11 rests on a suitable support 16 which is fixed and may be integral with the brake drum cover 7. This support 16 is located at one side and below the level of the center line of the brake drum. The tubular member 9 will be disposed completely at one side of the center line of the brake drum and in contracted position when the member 9 is void of actuating fluid and is pressed downward by a compression spring 17 which has its lower end portion disposed in encircling relation to an upstanding retaining stud 18 on the upper head 13 and its upper end portion encircling a depending retaining stud 19 on an arm 20 which may be integral with the brake drum cover and which extends within the brake drum above the center of the head 13. The lower and upper heads 11 and 13 have laterally extending arms 21 and 22, respectively. These supporting arms 21 and 22 extend laterally of the same side of the tubular member 9 and respectively are located below and above the center line of the brake drum, being longitudinally curved substantially along arcs of circles concentric with the central line of the brake drum and spaced apart sufficiently to afford clearance for portions of the associated wheel hub and axle which may extend into the brake drum. The outer ends of the arms 21 and 22 terminate in vertically spaced adjacent relation at the opposite side of the center line of the brake drum from the member 9 and respectively are rigidly secured to short parallel shafts 23 and 24, respectively which are maintained in spaced relation by links 25. The shafts 23 and 24 have end portions extending through the brake drum cover and on the extending end portions are rigidly secured a pair of arms 26 and 27, respectively. The arms 26 and 27 extend beyond the periphery of the brake drum and diverge slightly toward their outer ends from their connections with the respective shafts 23 and 24, the arm 27 being disposed directly above the arm 26. The arm 26 has a laterally turned pivot element 28 at its outer end journalled in a bearing in the aforesaid lug 4 on one of the ends of the brake band and the arm 27 has a similar laterally turned pivot element 29 which is journalled in a bearing in a coupling block 30 that is adapted to slide on the outer face of the other end portion of the brake band. The coupling block 30 has a shank 31 which extends slidably through an opening in the aforesaid lug 3 and is threadedly engaged by a nut 32 which can be adjusted on the shank 31 to vary the effective length of the coupling 32—31—30.

It will be observed that the lower head 11 is stationary and consequently the arms 21 and 26 remain stationary to afford an anchorage to the lower end of the brake band. However, the arms 22 and 27 constitute an actuating lever whose axis is about the shaft 24. Therefore it will be manifest that upon expansion of the member 9 the inner end of the arm 22 will be elevated rocking the arm 27 downwardly to contract the brake drum about the brake band.

The lower head 11 is provided with an opening 33 in which is secured an end portion of a combined fluid supply and exhaust tube 34.

From the foregoing description of the various parts of the device, the operation thereof may be readily understood. The tube 34 may lead from any suitable source of pressure fluid supply, which may be liquid under pressure or compressed air. It therefore is obvious that the brake band will be tightened on the drum when pressure fluid has entered the member 9 and has extended the member 9 or expanded it longitudinally against the action of the spring 17. As soon as the pressure within the member 9 has fallen sufficiently to permit the spring 17 to function, the member 9 will be contracted in length sufficiently to release the brake drum from the gripping action of the brake band. The shank 31 of the coupling may slide in the opening of the lug 3 a short distance so as to permit limited expansion and contraction of the member 9 without actuation of the brake band, if desired, or the nut 32 may be tightened so that any extension or contraction of the member 9 will actuate the brake band. It will be understood that in actual practice, the pressure fluid supply system with which the tube 34 is connected, will have suitable manually operable equipment for controlling the flow of pressure fluid into and from the member 9 so that the member 9 may be extended when desired to set or apply the brakes and may be permitted to contract longitudinally when desired to release the brakes. The operation of the device will be the same as hereinbefore described when the corrugated member 9ª is used in lieu of the member 9.

Obviously, the invention is susceptible of embodiment in forms other than those which are illustrated in the accompanying drawings, and I therefore consider as my own all such modifications and adaptations thereof as fairly fall within the scope of the appended claims.

I claim:—

1. The combination with a brake drum and its band, of a pair of members having portions located within the brake drum and having outer end portions pivotally connected with the ends of the brake band, links connecting the members intermediate their ends and constituting fulcrums, an expansible tubular member made of flexible material, heads closing the opposite ends of said tubular member and respectively connected with the second ends of said members, a fixed support for one of said heads, spring means acting against the other head and tending to force said last named head toward the first head, a pressure fluid conducting conduit having communication with the tubular member, and spring means reinforcing said tubular member against lateral expansion and distortion, one of the members constituting an actuating lever for contracting the brake band upon expansion of the tubular member.

2. The combination with a brake drum and its band, of a pair of members having portions located within the brake drum and having outer end portions pivotally connected with the ends of the brake band, links connecting the members intermediate the ends of the members and constituting fulcrums for the latter, a flexible tubular member, heads closing the opposite ends of said tubular member and respectively connected with the second ends of the members, a fixed support for one of said heads, spring means acting against the other head and tending to force said last named head toward the first head, and a pressure fluid conducting conduit having communication with the tubular member, said tubular member being circumferentially reinforced, one of the members constituting an actuating lever for contracting the brake band upon admission of fluid pressure into the tubular member, and the other member constituting an anchorage for the opposite end of the brake band.

ADELBERT E. LEE.